(12) United States Patent
Fersman et al.

(10) Patent No.: US 10,530,871 B2
(45) Date of Patent: Jan. 7, 2020

(54) CONTROLLING SERVICES DEPLOYMENT IN DISTRIBUTED COMPUTING SYSTEMS BASED ON HISTORICAL USE BY ELECTRONIC DEVICES

(71) Applicant: TELEFONAKTIEBOLAGET LM ERICSSON (PUBL), Stockholm (SE)

(72) Inventors: Elena Fersman, Stockholm (SE); Michael Åström, Rönninge (SE); Cristian Norlin, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 590 days.

(21) Appl. No.: 14/915,086

(22) PCT Filed: Sep. 4, 2013

(86) PCT No.: PCT/EP2013/068293
§ 371 (c)(1),
(2) Date: Feb. 26, 2016

(87) PCT Pub. No.: WO2015/032429
PCT Pub. Date: Mar. 12, 2015

(65) Prior Publication Data
US 2016/0205204 A1 Jul. 14, 2016

(51) Int. Cl.
*G06F 15/173* (2006.01)
*H04L 29/08* (2006.01)
(Continued)

(52) U.S. Cl.
CPC ............... *H04L 67/16* (2013.01); *G06F 8/60* (2013.01); *G06F 9/5061* (2013.01); *G06F 9/5072* (2013.01); *H04L 47/827* (2013.01)

(58) Field of Classification Search
CPC ......... H04L 67/16; H04L 47/827; G06F 8/60; G06F 9/5072; G06F 9/5061
See application file for complete search history.

(56) References Cited

U.S. PATENT DOCUMENTS

| 7,698,398 B1 * | 4/2010 | Lai | G06F 8/10 |
| | | | 709/223 |
| 8,447,829 B1 * | 5/2013 | Geller | G06F 9/468 |
| | | | 709/217 |

(Continued)

OTHER PUBLICATIONS

International Search Report issued in corresponding International application No. PCT/EP2013/068293 dated May 30, 2014, 3 pages.

*Primary Examiner* — Krisna Lim
(74) *Attorney, Agent, or Firm* — Rothwell, Figg, Ernst & Manbeck, P.C.

(57) ABSTRACT

A method by a control node (100) is disclosed for controlling deployment of services on computer resources within a distributed computing system (110) for use by electronic devices (120). The method includes recording information (200) that identifies characteristics of the electronic devices (120) and/or users of the electronic devices (120) that are provided which of the services. Dependent relationships between the services and the characteristics of the electronic devices (120) and/or the characteristics of the users of the electronic devices (120) are determined (202) based on the information. Deployment of the services on the computer resources within the distributed computing system (110) is controlled (204) based on the identified relationships and for use by the electronic devices (120). Related control nodes, systems, and computer program products are disclosed.

25 Claims, 5 Drawing Sheets

(51) Int. Cl.
  *H04L 12/911* (2013.01)
  *G06F 8/60* (2018.01)
  *G06F 9/50* (2006.01)

(56) References Cited

U.S. PATENT DOCUMENTS

| | | |
|---|---|---|
| 9,961,114 B2 * | 5/2018 | Srikanth ................. G06F 21/62 |
| 2007/0118560 A1 | 5/2007 | Bornhoevd et al. |
| 2008/0306798 A1 | 12/2008 | Anke et al. |
| 2009/0076952 A1 * | 3/2009 | Cadenas .............. G06Q 20/102 |
| | | 705/40 |
| 2010/0217867 A1 | 8/2010 | Bou-Ghannam et al. |
| 2012/0239739 A1 | 9/2012 | Manglik et al. |
| 2013/0031551 A1 | 1/2013 | Agarwal et al. |
| 2013/0042227 A1 | 2/2013 | Little et al. |
| 2013/0047146 A1 | 2/2013 | Ugur et al. |
| 2013/0097597 A1 | 4/2013 | Gibson et al. |
| 2014/0207919 A1 * | 7/2014 | Kowalski ............ H04L 41/0896 |
| | | 709/220 |

* cited by examiner

Group into a same one of the groups each of the services that is deployed for use by the electronic devices and/or users of the electronic devices having characteristics that satisfy at least one defined matching rule — 1100

FIGURE 11

Select among the computer resources within the distributed computing system for deployment of at least one of the services for use by one of the electronic devices based on distance between locations of the computer resources and a location of the electronic device — 1200

CONTROLLING SERVICES DEPLOYMENT IN DISTRIBUTED COMPUTING SYSTEMS BASED ON HISTORICAL USE BY ELECTRONIC DEVICES

CROSS REFERENCE TO RELATED APPLICATION(S)

This application is a 35 U.S.C. § 371 National Phase Entry Application from PCT/EP2013/068293, filed Sep. 4, 2013, designating the United States, the disclosure of which is incorporated by reference.

TECHNICAL FIELD

The present disclosure relates to computer systems, and in particular to controlling deployment of services on computer resources within a distributed computing system.

BACKGROUND

Distributed computing systems, sometimes also referred to as cloud computing systems, are used to provide services to electronic devices operated by end users. In a cloud computing system, the hardware and software computer resources configuration is hidden from the end user. Cloud computing systems may include servers, network storage devices, routers, gateways, communication links, and other physical hardware and software platforms. However, because services are deployed on physical hardware and software platforms which are hidden from end users, they can be managed, upgraded, replaced or otherwise changed by a system administrator without the end users being aware of or affected by the change.

In a cloud computing system, applications may be executed on virtual machines, which are isolated guest operating systems installed within a host system. Virtual machines are typically implemented with software emulation, hardware virtualization, or both. A single hardware and/or software platform may host a number of virtual machines, each of which may have access to some portion of the platform's resources, such as program code processing resources, storage resources, display resources, communication interfaces, etc.

In existing cloud and other distributed computing systems, the creator of the services or operator of the systems must know in advance which services (or types of services) should be deployed together, and provide associated instructions for controlling deployment of those services on computer resources within the cloud computing systems. However, cloud computing systems can offer a large number of different services, and new types of services and versions of services can be constantly created and made available for deployment. When consumers and enterprises find about new or other desirable services that are available in cloud computing systems, they can migrate quickly to requesting deployment of such services. However, these services may not be optimally deployed within cloud computing systems because, for example, the creator of the services or operator of the system may have insufficient knowledge of how to deploy these and other possibly related services on particular computer resources of the cloud computing system. Further complicating such deployment is that services may belong to different industrial domains, but used cross-domain, which makes it even more difficult for a creator or operator to predict which services will be used together. Consequently, consumers and enterprises may be provided sub-optimal or unsatisfactory services from cloud computing systems.

SUMMARY

Some embodiments disclosed herein are directed to a method by a control node for controlling deployment of services on computer resources within a distributed computing system for use by electronic devices. The method includes recording information that identifies characteristics of the electronic devices and/or users of the electronic devices that are provided which of the services. Dependent relationships between the services and the characteristics of the electronic devices and/or the characteristics of the users of the electronic devices are determined based on the information. Deployment of the services on the computer resources within the distributed computing system is controlled based on the identified relationships and for use by the electronic devices.

Potential advantages of this and other embodiments can include providing more optimal deployment of services on the computer resources within the distributed computing system. Services that have been determined to be often used simultaneously or consequently (within a short period of time) by users and/or electronic devices having common characteristics, can be deployed on the computer resources so as to minimize response times from these services and/or provide other improved quality of those services for those users/electronic devices, which can improve the user's (e.g., consumer or enterprise) satisfaction with the services provided by the distributed computing system.

For example, in some further embodiments, shared services data is generated that identifies, from the information, a plurality of the services that are provided to a plurality of the electronic devices and/or users of the electronic devices having common characteristics. Groupings of the services are then generated based on the shared services data. When a request message is received from one of the electronic devices that requests access to one of the services, characteristics of the electronic device and/or one of the users of the electronic device are identified based on the request message and one of the groupings of the services is identified based on the identified characteristics. Deployment of the services within the identified one of the groupings of services is controlled responsive to the request message.

The groupings of the services may be generated based on at least one of: location of the users of the electronic devices that are using the services; age of the users of the electronic devices that are using the services; gender of the users of the electronic devices that are using the services; occupation of the users of the electronic devices that are using the services; and operational characteristics of the electronic devices that are using the services.

Related control nodes are disclosed that control deployment of services on computer resources within distributed computing systems for use by electronic devices. A control node includes at least one processor and at least one memory. The memory is coupled to the processor and contains computer readable program code that when executed by the processor causes the processor to perform operations that include recording information that identifies characteristics of the electronic devices and/or users of the electronic devices that are provided which of the services. A determination is made, based on the information, of dependent relationships between the services and the characteristics of the electronic devices and/or the characteristics of the users of the electronic devices. Deployment of the services on the computer resources within the distributed computing system is controlled based on the identified relationships and for use by the electronic device.

It is noted that aspects described with respect to one embodiment may be incorporated in different embodiments although not specifically described relative thereto. That is, all embodiments and/or features of any embodiments can be combined in any way and/or combination. Moreover, other control nodes, systems, methods, and/or computer program products according to embodiments will be or become apparent to one with skill in the art upon review of the following drawings and detailed description. It is intended that all such additional control nodes, systems, methods, and/or computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

One or more of the foregoing problems may be overcome by various embodiments disclosed herein. Some embodiments are directed to methods and control nodes that determine what services provided by a distributed computing system are being used together and determine characteristics of the users and/or the electronic devices that are using the services. Deployment of the services on the computer resources within the distributed computing system is then controlled based on these determinations and for use by the electronic devices. The services may be grouped based on these determinations, and the grouped services can be deployed together onto computer resources for use by electronic devices. The user interfaces and/or application programming interfaces provided by the deployed services may be controlled responsive to these determinations.

In one example embodiment, a control node monitors the usage of cloud or other distributed computing system services and correlates the services usage with characteristics of the user and/or the electronic devices. Every time a request from an electronic device for a service is made, the characteristics of the user of the electronic device and/or the electronic device itself are saved to a repository together with a time stamp. Services that are being used within a given period of time by the same user are correlated. Groups of end-users that use the same groups of services are identified. Characteristics that are similar within the group, satisfying one or more defined matching rules, are identified.

For example, the learning process can determine that for users between 20-30 years of age, services such as Facebook and Twitter can be grouped in the same cluster for deployment together onto computer resources within the cloud or other distributed computing system. In this case, there is a correlation between the age of the user group and the group of services, and the identified group of services serves as an input for cloud deployment process. The identified group of services may alternatively or additionally be used to control the user interface and/or the application programming interface provided by the deployed services.

Advantages of these and other embodiments can include providing more optimal deployment of services on computer resources within a distributed computing system. Services that have been determined to be often used simultaneously or consequently (within a short period of time) by users and/or electronic devices having common characteristics, can be deployed on the computer resources so as to minimize response times from these services and/or provide other improved quality of those services for those users/electronic devices, which can improve the user's (e.g., consumer or enterprise) satisfaction with the services provided by the distributed computing system.

These and other embodiments are described in further detail below with regard to the system of FIG. 1 and the operations and methods illustrated in the flowcharts of FIGS. 2-12.

Figure 1:
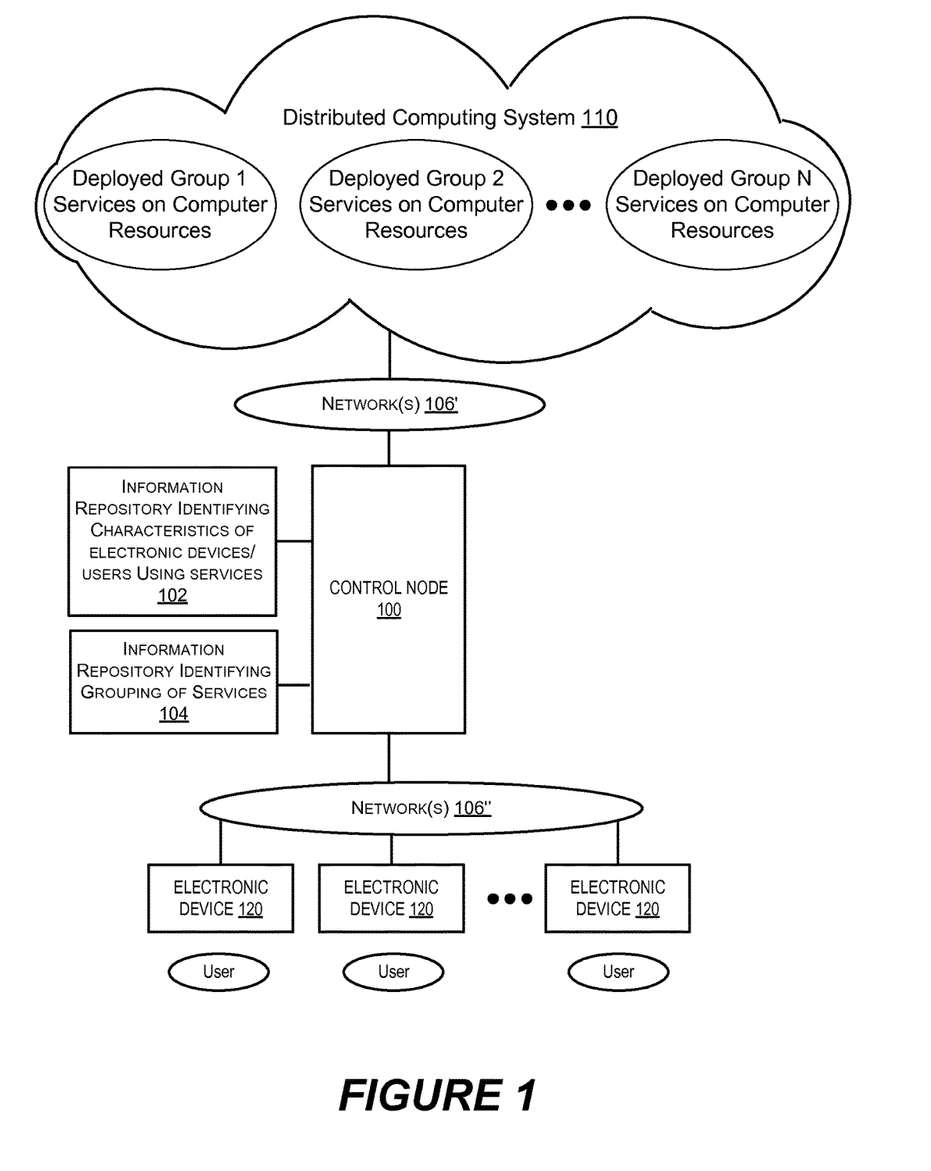
FIG. 1 is a block diagram of a distributed computer environment that controls deployment of services on computer resources for use by electronic devices, in accordance with some embodiments.

FIG. 1 illustrates a distributed (e.g., cloud) computing environment in which the subject matter of the present disclosure can be implemented. In FIG. 1, a control node 100 is provided for controlling deployment of services on computer resources within a distributed computing system 110 for use by a plurality of electronic devices 120 that may be operated by users. The computer resources can include, but are not limited to, servers, network and/or local storage devices, routers, gateways, communication interfaces, program code processors, memories, display devices, communication interfaces, software (e.g., applications, operating systems, web services, etc.), etc.

One or more networks 106' and 106" communicatively interconnect the control node 100 to the computer resources within the distributed computing system 110 and to the electronic devices 120. The networks 106' and 106" facilitates wireless or wired communications between the control node 100, the computer resources within the distributed computing system 110, and to the electronic devices 120. The networks 106' and 106" may include one or more local area networks (LANs), radio access networks (RANs), metropolitan area networks (MANS), wide area networks (WANs), the Internet, and/or any other communication system or systems at one or more locations.

The control node 100 records (block 200 of FIG. 2) information that identifies characteristics of the electronic devices 120 and/or users of the electronic devices 120 that are provided which of the services. The characteristics can include, but are not limited to, location of the users of the electronic devices that are using the services; age of the users of the electronic devices that are using the services; gender of the users of the electronic devices that are using the services; occupation of the users of the electronic devices that are using the services; and operational characteristics of the electronic devices that are using the services.

The control node 100 determines, (block 202 of FIG. 2) based on the information, dependent relationships between the services and the characteristics of the electronic devices 120 and/or the characteristics of the users of the electronic devices 120. The control node 100 controls (block 204 of FIG. 2) deployment of the services on the computer resources within the distributed computing system 110 based on the identified relationships and for use by the electronic devices 120.

The services can include any functionality that can be provided for use by electronic devices, end users of electronic devices, etc, and can include, but are not limited to: social networking services (e.g., Facebook, etc.), video/picture storage/sharing services (e.g., YouTube, Snapfish, PhotoBucket, etc.), file storage/sharing services (e.g., DropBox, etc.), on-line gaming services, shopping services, word processing services, database services, data analysis services, etc.

In a further embodiment, the operations and methods for determining (block 202 of FIG. 2) the dependent relationships between the services and the characteristics of the electronic devices and/or the users can include, generating (block 300 of FIG. 3) shared services data that identifies, from the information, a plurality of the services that are provided to a plurality of the electronic devices 120 and/or users of the electronic devices 120 having common characteristics, and generating (block 302 of FIG. 3) groupings of the services based on the shared services data.

Operations and methods for controlling deployment of the services on the computer resources can include receiving (block 304 of FIG. 3) a request message from one of the electronic devices 120 that requests access to one of the services. Characteristics of the electronic device and/or one of the users of the electronic device are identified (block 306 of FIG. 3) based on the request message. One of the groupings of the services is identified (block 308 of FIG. 3) based on the identified characteristics. Deployment of the one of the services and at least one other one of the services within the identified one of the groupings of services is controlled (block 310 of FIG. 3) responsive to the request message.

To control the deployment of a group the services, the control node 100 may determine (block 400 of FIG. 4) quality of service requirements of the one of the services and the at least one other one of the services within the identified one of the groupings of services, and select (block 402 of FIG. 4) among the computer resources within the distributed computing system 110 based on the quality of service requirements for deployment of the services within the identified one of the groupings of services.

In a further example, the control node 100 may determine (block 500 of FIG. 5) a quality of service capability that can be provided by different ones of the computer resources within the distributed computing system 110 to provide the services within the identified one of the groupings of services to the one of the electronic devices 120, and select (block 502 of FIG. 5) among the computer resources within the distributed computing system 110 based on the determined quality of service requirements and the determined quality of service capabilities.

Although various embodiments are disclosed herein in the context of the control node 100 controlling deployment of services onto computer resources, the control node 100 may additionally or alternatively control the appearance, operation, or other controllable/defined aspects of the user interface and/or the application programming interface provided by services within a defined group. For example, the control node 100 may change (block 600 of FIG. 6) what user interfaces are provided by the services (e.g., by application software) within the identified one of the groupings of services based on which of the services within the identified one of the groupings of services are deployed together for use by the electronic device 120. An advantage of this approach can include providing automated customization of the user interfaces provided by a group of applications that are deployed together in order to increase the usability and/or other user desired characteristics of the associated services.

In a further example, the control node 100 may select (block 600 of FIG. 6) among a plurality of user interfaces that can be provided by each of the services within the identified one of the groupings of services based on which of the services within the identified one of the groupings of services are deployed together for use by the electronic device 120, and deploy (block 602 of FIG. 6) the services configured with the selected user interfaces for use by the electronic device 120.

The control node 100 may change (block 700 of FIG. 7) an application programming interface provided by the services (e.g., by application software) within the identified one of the groupings of services based on which of the services within the identified one of the groupings of services are deployed together for use by the electronic device 120. In a further example, the control node 100 may select (block 700 of FIG. 7) among a plurality of application programming interface that can be provided by each of the services within the identified one of the groupings of services based on which of the services within the identified one of the groupings of services are deployed together for use by the electronic device 120, and deploy (block 702 of FIG. 7) the services configured with the selected application programming interface for use by the electronic device 120. An advantage of this approach can include providing automated customization of the application programming interfaces provided by a group of applications that are deployed together in order to increase or otherwise control interoperability of the group of applications, increase or otherwise control the communication capabilities and/or processes between the group, and/or to increase or otherwise control the combined functionality from the group.

Figure 8:
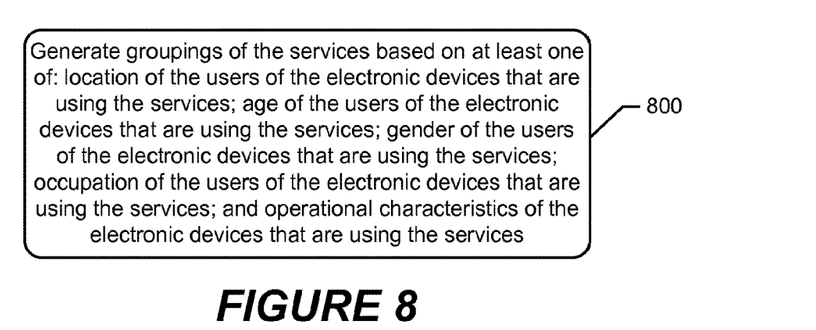
Figure 9:
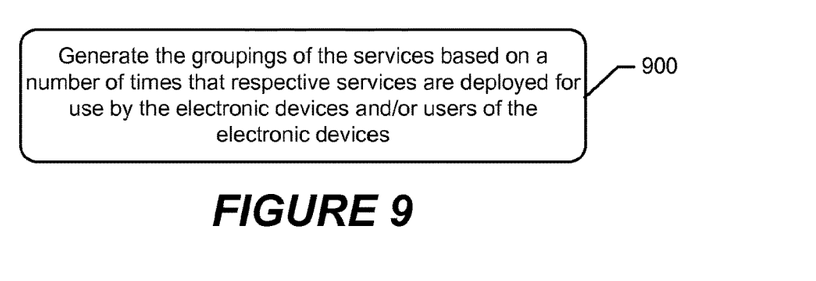
Figure 10:
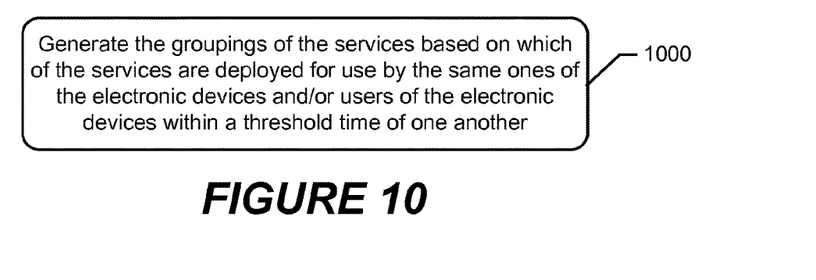
Figure 11:
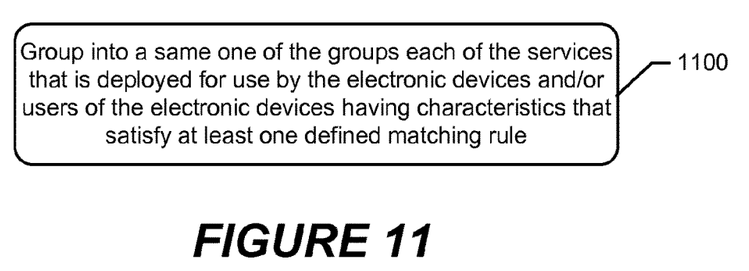
Figure 12:
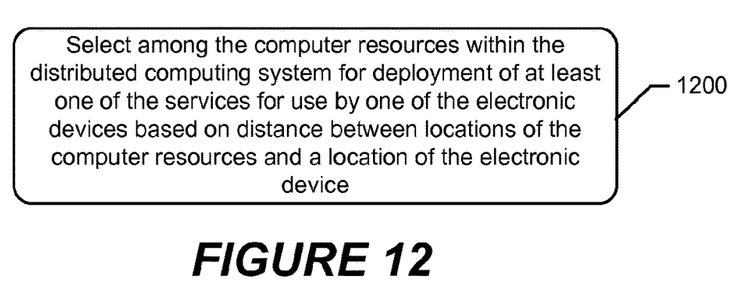

The services provided by the distributed computing system 110 for use by the electronic devices 120/users, may be grouped based on one of more of the characteristics identified in block 800 of FIG. 8. For example, some services may be grouped based on the location of the users of the electronic devices 120 that are using the services. The locations may be determined based on GPS or other information provided by the electronic devices 120 and/or by a communication system that services the electronic devices 120 (e.g., network location services). The control node 100 may then control (block 204 of FIG. 2) deployment of the services on the computer resources within the distributed computing system by selecting (block 1200 of FIG. 12) among the computer resources within the distributed computing system 110 for deployment of at least one of the services for use by one of the electronic devices 120 based on distance between locations of the computer resources and a location of the electronic device 120. Thus, for example, the services may be deployed onto computer resources that are within a threshold distance of the electronic devices 120 requesting such services. As advantage of such localized deployment of services may be to decrease communication latencies between the electronic devices 120 and the computer resources providing services, and to provide improved balancing of the processing and communication loading on computer resources that are provided from various sites (e.g., processing warehouses) located near corresponding groupings of users.

The services may alternatively or additionally be grouped based on the age, gender, and/or occupation of the users of the electronic devices (120) who are using the services, which may be retrieved from account information that is maintained for the users and/or retrieved from other service providers to the users (e.g., social network service providers such as Facebook).

Alternatively or additionally, the services may be grouped based on operational characteristics of the electronic devices 120 that are using the services, such as based on the type of operating system, device manufacturer identity, hardware processor type, available device memory, supported communication interface (e.g., standards protocol(s) supported, communication bandwidth, etc.), etc.

The various groupings may be generated (block 900 of FIG. 9) based on which of the services are deployed for use by the same ones of the electronic devices 120 and/or users of the electronic devices 120 within a threshold time of one another.

The control node 100 may group (block 1000 of FIG. 10) into a same one of the groups each of the services that is deployed for use by the electronic devices 120 and/or users of the electronic devices 120 having characteristics that satisfy at least one defined matching rule. Such characteristics may, as explained above, correspond to users having ages within a defined range, users having a defined gender, users having a defined occupation, users who are physically located within a defined geographic region or within a threshold distance of a defined location, etc.

More generally, the control node 100 may group (block 1100 of FIG. 11) into a same one of the groups each of the services that is deployed for use by the electronic devices 120 and/or users of the electronic devices 120 having characteristics that satisfy at least one defined matching rule, where the matching rule(s) can define any number of characteristics that can be retrieved, sensed, or determined for the electronic devices 120 and/or users of the electronic devices 120.

For example, as shown in FIG. 1, a first group of the services ("Group 1 Services") has been deployed on one set of computer resources of the distributed computing system 110. Similarly, a second group of the services ("Group 2 Services") has been deployed on another set of computer resources of the distributed computing system 110, and an N'th group of the services ("Group N Services") has been deployed on yet another set of computer resources of the distributed computing system 110. The number of groups ("N") can be any plural number and may be controlled based on one or more rules, such as to control the generation methods of FIG. 3. Some of the same services may be present in one or more of the groups, and some of the groups of services may be deployed onto at least partially overlapping computer resources of the distributed computing system 110.

By way of further example, if the distributed computing system 110 supports a large number of different software applications providing corresponding different services, some of the software applications can be grouped within the first group of services in response to the control node 100 determining that those services are used simultaneously in time or within a defined threshold of one another by users and/or electronic devices having same or similar characteristics which satisfy one or more defined matching rules. Similarly, other groupings of some of the 100 software applications can be generated based on corresponding other determinations of their usage simultaneously in time or within a defined threshold of one another by users and/or electronic devices having same or similar characteristics for such groupings which satisfy one or more defined matching rules.

Figure 2:
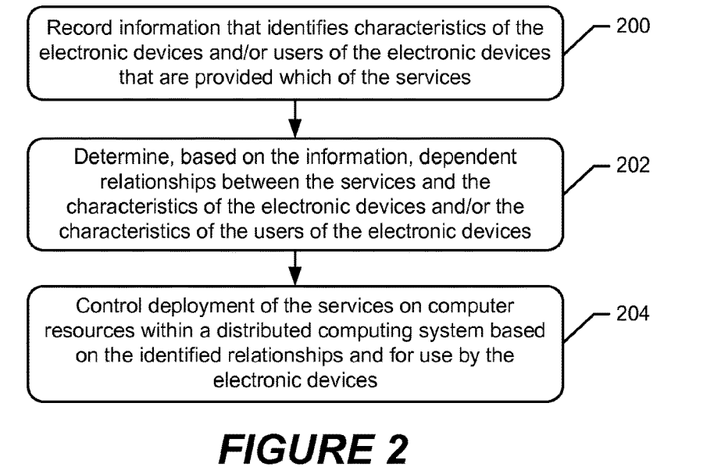
FIGS. 2-12 are flowcharts that illustrate methods and operations for controlling deployment of services on computer resources within the distributed computing system according to some embodiments.
Figure 3:
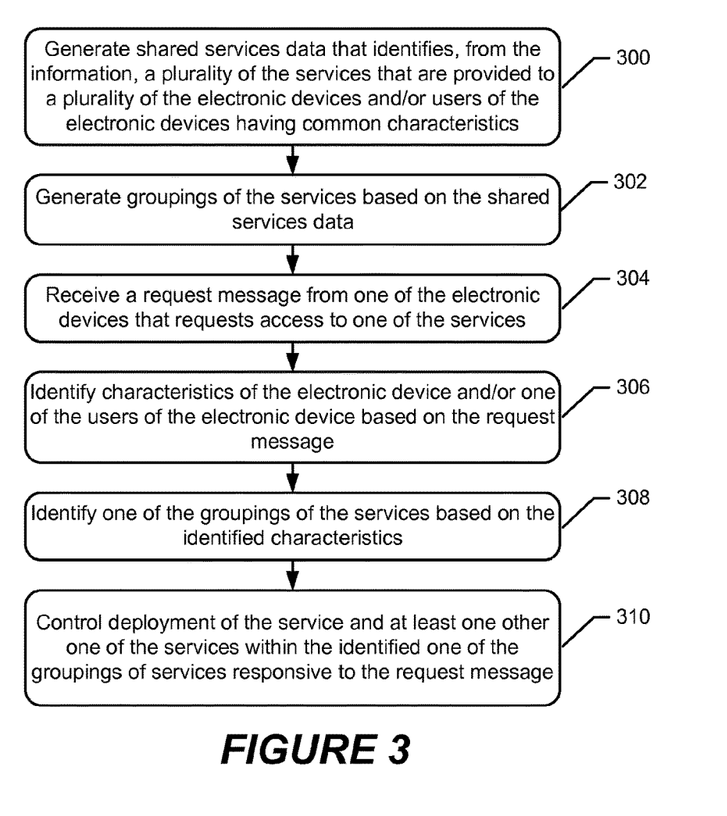
Figure 4:
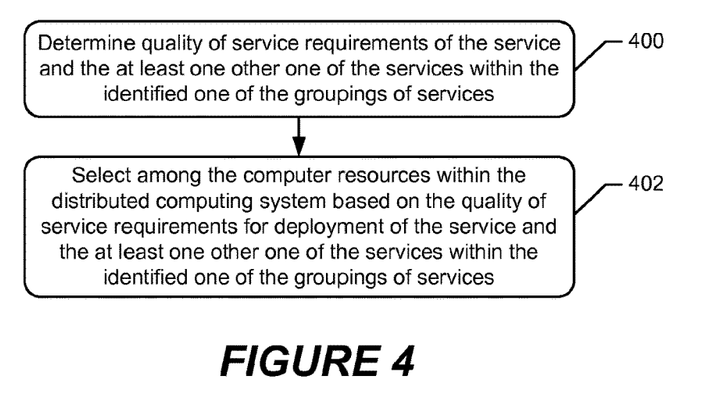
Figure 5:
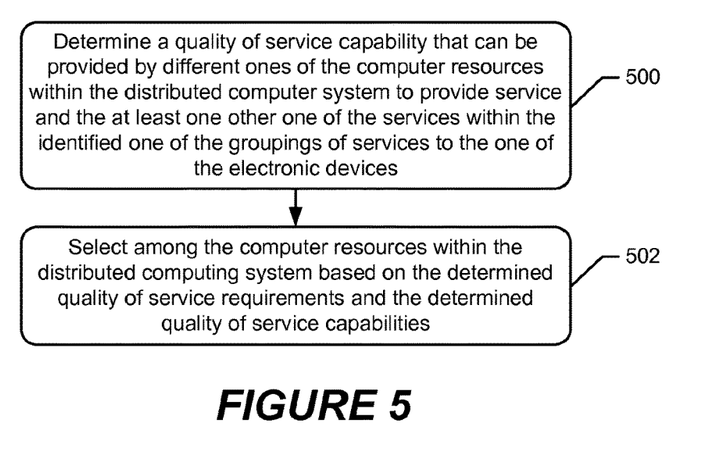
Figure 6:
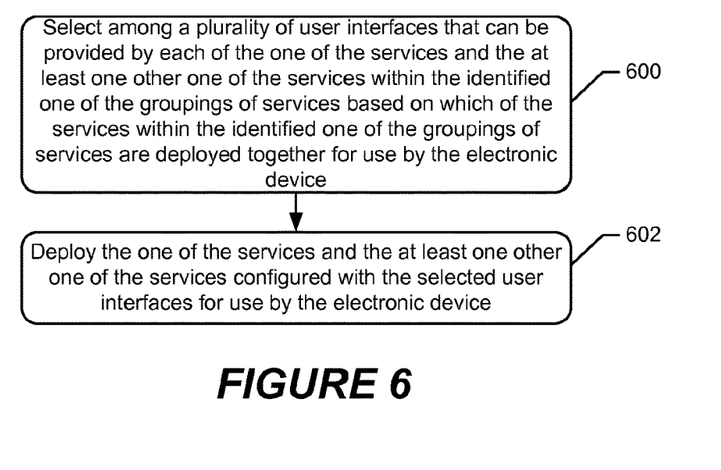
Figure 7:
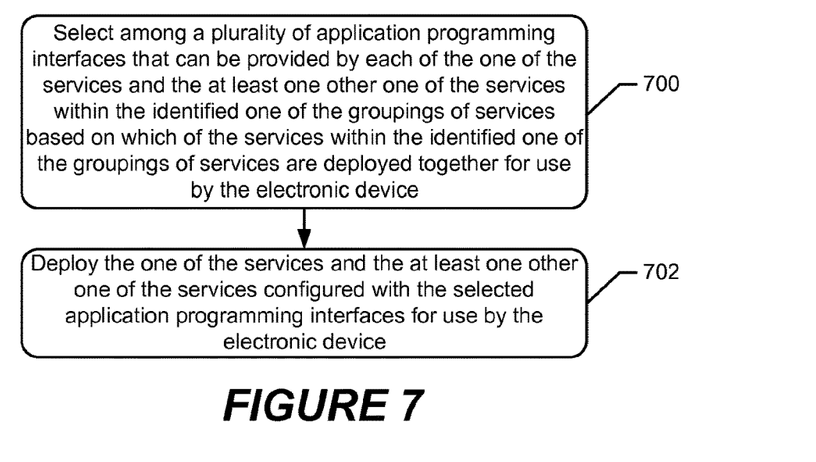

A repository 102 can be used to store the recorded information which identifies characteristics of the electronic devices 120 and/or users of the electronic devices 120 that are provided which of the services, such as the information recorded in the operations and methods of block 200 of FIG. 2. Another repository 104 can be used to store information identifying which services are included within which groupings, such as the information generated by the operations and methods of block 302 of FIG. 3. The repositories 102 and 104 can be accessed by the control node 100 for retrievable storage of information used to perform one or more of the operations and methods of FIGS. 2-12 as explained herein.

Example Control Node

Figure 13:
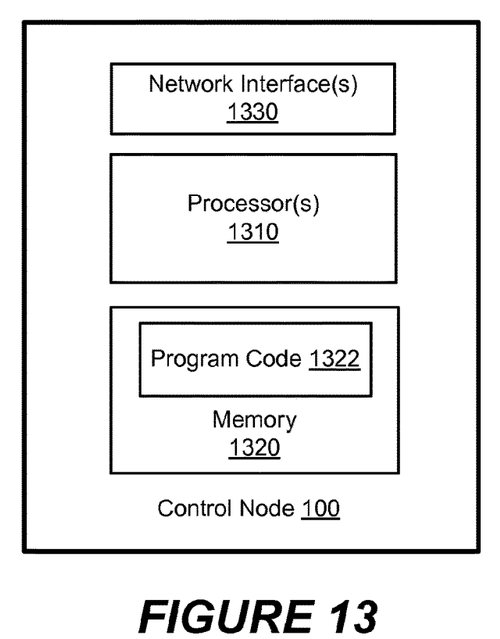
FIG. 13 is a block diagram of a control node that is configured according to some embodiments.

FIG. 13 is a block diagram of a control node 100 that is configured according to some embodiments. The control node 100 may be used as the control node of FIG. 1 and be configured to perform the operations and methods of one of more of FIGS. 2-12. The control node 100 can include one or more network interfaces 1330, one or more processors 1310 (referred to as "processor" for brevity), and one or more memories 1320 (referred to as "memory" for brevity) containing program code 1322.

The processor 1310 may include one or more data processing circuits, such as a general purpose and/or special purpose processor (e.g., microprocessor and/or digital signal processor) that may be collocated or distributed across one or more networks. The processor 1310 is configured to execute program code 1322 in the memory 1320, described below as a computer readable medium, to perform some or all of the operations and methods that are described above for one or more of the embodiments, such as the embodiments of FIGS. 2-12. Accordingly, the processor 1310 can be configured by execution of the program code 1322 to carry out at least some of the functionality disclosed herein to control deployment of services on computer resources within a distributed computing system for use by electronic devices.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" and "/" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method by a control node for controlling a deployment of services on computer resources within a distributed computing system for use by electronic devices, the method comprising:
   recording information that identifies characteristics of the electronic devices and/or users of the electronic devices that are provided which of the services;
   determining, based on the information, dependent relationships between the services and the characteristics of the electronic devices and/or the characteristics of the users of the electronic devices; and
   controlling the deployment of the services on the computer resources within the distributed computing system based on the determined dependent relationships and for use by the electronic devices, wherein
   determining, based on the information, dependent relationships between the services and the characteristics of the electronic devices and/or the characteristics of the users of the electronic devices comprises:
   generating shared services data that identifies, from the information, a plurality of the services that are provided to a plurality of the electronic devices and/or users of the electronic devices having common characteristics; and generating, based on the shared services data, a plurality of service groups including a first service group and a second service group that is different than the first service group.

2. The method of claim 1, wherein controlling deployment of the services on the computer resources within the distributed computing system based on the determined dependent relationships to provide services to the electronic devices comprises:
receiving a request message from one of the electronic devices that requests access to a first service;
identifying characteristics of the electronic device and/or one of the users of the electronic device based on the request message;
selecting one of the plurality of service groupings based on the identified characteristics, wherein the selected service grouping includes the first service and at least one other service; and
in response to the request message, controlling deployment of the first service and at least one other service included in the selected service grouping , wherein controlling deployment of the first service and the other service comprises deploying the first service and the other service.

3. The method of claim 2, wherein controlling deployment of the first service and the other service comprises:
determining quality of service requirements of the first service and the other service; and
selecting among the computer resources within the distributed computing system based on the quality of service requirements for deployment of the first service and the other service.

4. The method of claim 3, wherein controlling deployment of the first service and the other service further comprises:
determining a quality of service capability that can be provided by different ones of the computer resources within the distributed computing system to provide the first service and the other service to the one of the electronic devices; and
selecting among the computer resources within the distributed computing system based on the determined quality of service requirements and the determined quality of service capabilities.

5. The method of claim 2, wherein controlling deployment of the first service and the other service comprises:
changing user interfaces provided by the first service and the other service based on which of the services within the identified one of the groupings of services are deployed together for use by the electronic device.

6. The method of claim 2, wherein controlling deployment of the first service and the other service comprises:
selecting among a plurality of user interfaces that can be provided by each of the first service and the other service; and
deploying the first service and the other service configured with the selected user interfaces for use by the electronic device.

7. The method of claim 2, wherein controlling deployment of the one of the services and at least one other one of the services within the identified one of the groupings of services responsive to the request message comprises:
changing an application programming interface provided by the first service and the other service.

8. The method of claim 2, wherein controlling deployment of the one of the services and at least one other one of the services within the identified one of the groupings of services responsive to the request message comprises:
selecting among a plurality of application programming interface that can be provided by each of the first service and the other service; and
deploying the first service and the other service configured with the selected application programming interface for use by the electronic device.

9. The method of claim 1, wherein generating groupings of the services based on the shared services data comprises:
generating groupings of the services based on at least one of: location of the users of the electronic devices that are using the services; age of the users of the electronic devices that are using the services; gender of the users of the electronic devices that are using the services; occupation of the users of the electronic devices that are using the services; and operational characteristics of the electronic devices that are using the services.

10. The method of claim 1, wherein generating groupings of the services based on the shared services data comprises:
generating the groupings of the services based on a number of times that respective services are deployed for use by the electronic devices and/or users of the electronic devices.

11. The method of claim 1, wherein generating groupings of the services based on the shared services data comprises:
generating the groupings of the services based on which of the services are deployed for use by the same ones of the electronic devices and/or users of the electronic devices within a threshold time of one another.

12. The method of claim 1, wherein generating groupings of the services comprises:
grouping into a same one of the groups each of the services that is deployed for use by the electronic devices and/or users of the electronic devices having characteristics that satisfy at least one defined matching rule.

13. A control node for controlling a deployment of services on computer resources within a distributed computing system for use by electronic devices, the control node comprising:
at least one processor; and
at least one memory coupled to the at least one processor and comprising computer readable program code that when executed by the at least one processor causes the at least one processor to perform operations comprising:
recording information that identifies characteristics of the electronic devices and/or users of the electronic devices that are provided which of the services;
determining, based on the information, dependent relationships between the services and the characteristics of the electronic devices and/or the characteristics of the users of the electronic devices; and
controlling the deployment of the services on the computer resources within the distributed computing system based on the determined dependent relationships and for use by the electronic device, wherein
the computer readable program code when executed by the at least one processor causes the at least one processor to determine the relationships based on performing further operations comprising:
generating shared services data that identifies, from the information, a plurality of the services that are provided to a plurality of the electronic devices and/or users of the electronic devices having common characteristics; and generating, based on the shared services data, a plurality of service groups including a first service group and a second service group that is different than the first service group.

14. The control node of claim 13, wherein the computer readable program code when executed by the at least one processor causes the at least one processor to control deployment of the services based on performing further operations comprising:
  receiving a request message from one of the electronic devices that requests access to a first service;
  identifying characteristics of the electronic device and/or one of the users of the electronic device based on the request message;
  selecting one of the plurality of service groupings based on the identified characteristics, wherein the selected service grouping includes the first service and at least one other service; and
  in response to the request message, controlling deployment of the first service and at least one other service included in the selected service grouping, wherein controlling deployment of the first service and the other service comprises deploying the first service and the other service.

15. The control node of claim 14, wherein the computer readable program code when executed by the at least one processor causes the at least one processor to control deployment of the first service and the other service based on performing further operations comprising:
  determining quality of service requirements of the first service and the other service;
  determining a quality of service capability that can be provided by different ones of the computer resources within the distributed computing system; and
  selecting among the computer resources within the distributed computing system based on the determined quality of service requirements and the determined quality of service capabilities.

16. The control node of claim 14, wherein the computer readable program code when executed by the at least one processor causes the at least one processor to control deployment of the first service and the other service based on performing further operations comprising:
  selecting among a plurality of user interfaces that can be provided by each of the first service and the other service; and
  deploying the first service and the other service configured with the selected user interfaces for use by the electronic device.

17. The control node of claim 14, wherein the computer readable program code when executed by the at least one processor causes the at least one processor to control deployment of the first service and the other service based on performing further operations comprising:
  selecting among a plurality of application programming interface that can be provided by each of the first service and the other service based on which of the services within the identified one of the groupings of services are deployed together for use by the electronic device; and
  deploying the first service and the other service configured with the selected application programming interface for use by the electronic device.

18. The control node of claim 13, wherein the computer readable program code when executed by the at least one processor causes the at least one processor to generate groupings of the services based on performing further operations comprising:
  generating groupings of the services based on at least one of: location of the users of the electronic devices that are using the services; age of the users of the electronic devices that are using the services; gender of the users of the electronic devices that are using the services; occupation of the users of the electronic devices that are using the services; and operational characteristics of the electronic devices that are using the services.

19. The control node of claim 13, wherein the computer readable program code when executed by the at least one processor causes the at least one processor to generate groupings of the services based on performing further operations comprising:
  generating the groupings of the services based on a number of times that respective services are deployed for use by the electronic devices and/or users of the electronic devices.

20. The control node of claim 13, wherein the computer readable program code when executed by the at least one processor causes the at least one processor to generate groupings of the services based on performing further operations comprising:
  generating the groupings of the services based on which of the services are deployed for use by the same ones of the electronic devices and/or users of the electronic devices within a threshold time of one another.

21. A method for deploying services on computer resources within a computing system, the method comprising:
  receiving a request message transmitted by a communication device, the request message requesting deployment of a first service, but not requesting deployment of a second service that is different than the first service; and
  in response to the request message requesting deployment of the first service, but not requesting deployment of a second service that is different than the first service, performing a process comprising:
  obtaining characteristic information, the characteristic information identifying a set of one or more characteristics of at least one of: the communication device and a user of the communication device;
  identifying a group of services associated with the identified set of characteristics, said group of services comprising the second service that is different than the first service; and
  deploying both the first service and the second service.

22. The method of claim 21, wherein the set of one or more characteristics consists of one or more characteristics of the user of the communication device.

23. The method of claim 22, wherein the one or more characteristics of the user of the communication device comprises at least one of:
  the location of the user;
  the age of the user; and
  the gender of the user.

24. A method for deploying services on computer resources within a computing system, the method comprising:
  receiving a first request transmitted by a first communication device (CD), the first request requesting access to a first service;
  recording first timing information associated with the first request;

receiving a second request transmitted by the first CD, the second request requesting access to a second service;

recording second timing information associated with the second request;

based on the first and second timing information, determining whether to associate a service group comprising the first service and the second service with first characteristic information, the first characteristic information identifying a first set of one or more characteristics of the first CD and/or a user of the first CD;

associating the service group with the first characteristic information;

receiving a third request transmitted by a second CD, the third request requesting access to the first service;

recording third timing information associated with the third request;

receiving a fourth request transmitted by the second CD, the fourth request requesting access to the second service;

recording fourth timing information associated with the fourth request;

based on the third and fourth timing information, determining whether to associate the service group with second characteristic information, the second characteristic information identifying a second set of one or more characteristics of the second CD and/or a user of the second CD;

determining a set of one or more characteristic that are included in both the first set of characteristics and the second set of characteristics;

associating the service group with the determined set of characteristics.

25. The method of claim 24, further comprising:

receiving a request message transmitted by a third CD, the request message requesting access to the first service but not requesting access to the second service; and in response to receiving the request message, which requests access to the first service but not access to the second service, performing a process comprising:

obtaining characteristic information identifying a set of one or more characteristics of the third CD and/or a user of the third CD;

determining whether the set of one or more characteristics of the third CD and/or a user of the third CD includes the determined set of characteristics that is associated with the service group; and as a result of determining that the set of one or more characteristics of the third CD and/or a user of the third CD includes the determined set of characteristics that is associated with the service group, deploying both the first service and the second service regardless of the fact that the request message did not request access to the second service.

* * * * *